June 1, 1954

M. H. KEMP 2,679,858

ADJUSTABLE NONCHATTERING RELIEF VALVE

Filed Oct. 10, 1950

INVENTOR.
MANNING H. KEMP
BY
ATTORNEYS

Patented June 1, 1954

2,679,858

UNITED STATES PATENT OFFICE 2,679,858

ADJUSTABLE NONCHATTERING RELIEF VALVE

Manning H. Kemp, West Monroe, La.

Application October 10, 1950, Serial No. 189,447

1 Claim. (Cl. 137—382)

This invention relates to a relief valve for use in fluid pressure systems.

An object of this invention is to provide a relief valve which is particularly adapted to obviate objectionable valve chatter and knocking due to the vibration or flutter when the valve element leaves or approaches its seat.

Another object of this invention is to provide a spring-biased relief valve which, upon installation in a pipe line, requires but one simple manual adjustment for varying the spring bias of the valve element.

A further object of this invention is to provide a relief valve which can be installed in a pipe line with speed and facility and can be removed therefrom without breaking the pipe line.

A still further object of this invention is to provide a spring-biased relief valve which is relatively simple in structure, cheap to manufacture, and easy to service.

The above and still further objects and advantages of the invention will become apparent upon consideration of the following detailed description of the invention, when taken in conjunction with the accompanying drawings, wherein.

Figure 1:
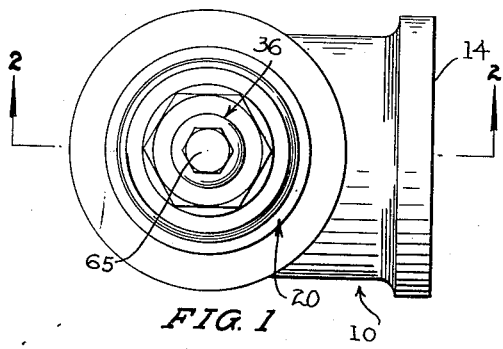
Figure 1 is a top plan view of the relief valve of the present invention.

Referring now more particularly to the drawings, wherein like reference numerals have been used throughout the several views to designate like parts, there is shown the relief valve of the present invention, generally designated by the reference numeral 10 which includes an open-ended valve body 11 having a chambered interior 12.

Dependingly carried from the lower open end of the valve body 11 is an exteriorly threaded extension 13 which is particularly adapted for securing the lower open end of the valve body to a source of fluid under pressure. Intermediate its ends, the valve body 11 is provided with a laterally projecting extension 14 which is in communication with the chambered interior 12 of the valve and is interiorly threaded, as indicated by the reference numeral 15 to particularly adapt the extension 14 for the reception of an outlet pipe.

Extending inwardly from the end of the valve body carrying the extension 13, there is provided a bore 16 which terminates at a point contiguous to the laterally projecting outlet 14 and is in communication with the adjacent portions of the chambered interior 12. Contiguous to the terminating end of the bore 16, the bounding portions of the chambered interior 12 of the valve body 11 are provided with a transversely disposed valve seat 17.

Slidably supported within the bore 16 is a hollow cylindrical valve element 18 which has one end closed and provided with a laterally extending flange 19 engageable with the seat 17 in a select position of the sliding movement of the valve element 18.

Bridging the open end of the valve body 11 remote from the threaded extension 13 is a bonnet or closure plug 20 which is exteriorly threaded contiguous to one end, as indicated by the reference numeral 21, to thereby particularly adapt the bonnet 20 for detachable securement to a threaded bore 22 of the valve body 11. The bonnet 20 is provided with a longitudinally extending threaded bore 23 which has its lowermost end in communication with the chambered interior 12 of the valve body 11.

Positioned in end-to-end, spaced relation with respect to the valve element 18 is an adjusting screw 24 which is supported longitudinally of the closure plug or bonnet 20 within the threaded bore 23 for movement toward and away from the valve element 18.

Positioned within the chambered interior 12 of the valve body 11 is a resilient element 26 which has one end operatively connected to the valve element 18 and has the other end operatively connected to the adjacent end of the adjusting screw 24, the resilient element normally biasing the annular flange 19 of the valve element 18 into engagement with the valve seat 17. The resilient element 26 is operatively connected to the adjacent end of the adjusting screw 24 by means of the plate 27 which has one face provided with an extension 28 secured to the adjacent end of the adjusting screw 24 and has the other end provided with a depending lug 29 receivable within the resilient element 26, the latter being illustrated as a coil spring. The connection of the coil spring 26 to the valve element 18 is effected by means of another lug 30 which is disposed in opposed spaced relation with respect to the lug 29 and fixedly secured to the adjacent face of the closed end of the valve element 18.

Figure 2:
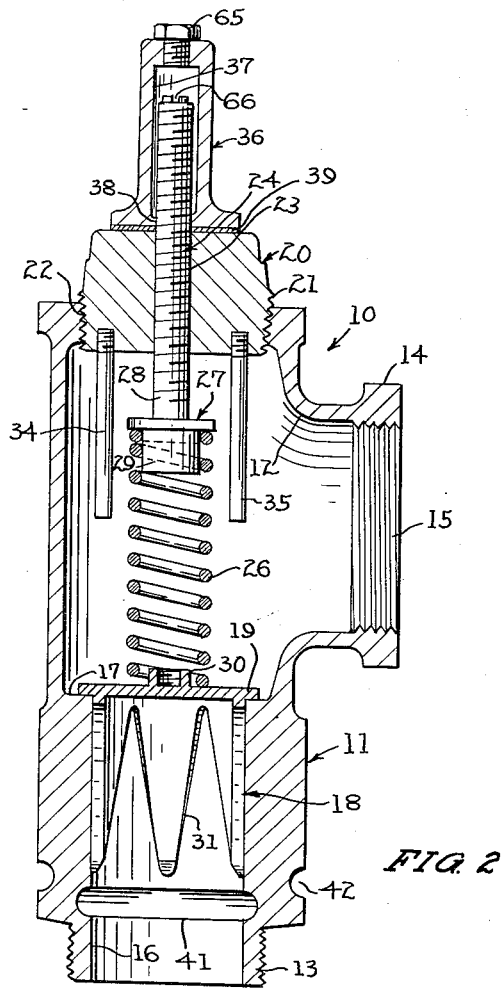
Figure 2 is a longitudinal sectional view taken along the line 2—2 of Figure 1.

The valve element 18 is provided with suitable means for discharging a portion of the fluid flowing inwardly through the inlet end thereof. As clearly shown in Figure 2, the means embodies a plurality of longitudinally extending, circumferentially spaced, generally V-shaped escape ports, generally designated by the reference numeral 31, provided in the valve element 18. Each of the ports has its apex contiguous to and spaced from the closed end of the valve element 18 and accordingly each provides progressively larger escape areas upon movement of the annular flange 19 of the valve element 18 out of engagement with the valve seat 17.

Positioned longitudinally within the chambered interior of the valve body 11 is a pair of spaced stop bars 34 and 35, each of which has one end detachably secured to the adjacent end of the closure plug 20 and has the other end terminating at a point adjacent to and spaced from the adjacent end of the valve element 18. Accordingly, upon movement of the valve element 18 into a select position out of engagement with the valve seat 17, the free ends of the stop rods 34 and 35 will engage the closed end of the valve element and preclude further movement of the valve element away from the valve seat.

Circumposed about the exteriorly projecting end of the adjusting screw 24 is a cover and lock 36 which is operatively connected to the adjusting screw and engageable with the closure plug for covering the exteriorly projecting end of the adjusting screw and for holding the latter in a select position of its movement with respect to the valve element. The cover and lock 36 has a hollow interior 37 adapted to receive the adjusting screw 24, and is provided with a tapped portion 38 adapted to loosely fit on the adjusting screw 24. The loose fit of the tap portion 38 of the cover 37 eliminates the necessity for an additional locking nut, since the desired spring setting will not be altered when the cover 36 is circumposed about the adjusting screw 24 and engaged against the adjacent end of the plug 20. A suitable gasket 39 is provided between the abutting surfaces of the closure plug 20 and the cover and lock 36, to form a fluid-tight seal therebetween. The cover and lock 36 is provided with a removable cap 65, and the adjacent end of the adjusting element is slotted, as indicated by the numeral 66. Accordingly, upon removing cap 65, the pressure exerted by spring 26 can be manually adjusted without effecting the removal of the cover and lock 36.

Upon effecting securement of the threaded extension 13 to an inlet pipe, an inwardly directed force will be applied to the valve body 11 in the area of the bore 16. This force often causes a binding between the periphery of the cylindrical valve element 18 and the bounding walls of the bore. To prevent this binding, a transversely disposed notch, generally designated by the reference numeral 41, is provided in the areas subjected to the inwardly directed force. As clearly shown in Figure 2, the notch 41 is spaced inwardly of the threaded extension 13 and is semicylindrical in cross-section. Similarly, a second notch 42 is provided exteriorly of the valve body at a point adjacent to and spaced from the threaded extension 13, the notch 42 cooperating with the notch 41 to prevent the binding between the valve element 18 and the walls of the bore 16.

When in actual operation, the valve element 18 leaves the seat 17 due to the pressure exerted thereon from the inlet end of the valve body, and remains off the seat in high frequency fluctuations for periods in which the inlet pressure is greater than the oppositely directed force due to the spring 26. When the valve element once again returns to its position in engagement with the valve seat 17, the inlet pressure is too low to cause any chattering of the valve. It is to be noted that the areas of the escape or discharge ports 31 are selected so that a greater area is exposed for the egress of fluid than the area of the inlet pipe, the optimum discharge area being reached at a point prior to engagement between the valve element and the stop rods 34 and 35. Accordingly, if necessary, a full-capacity flow can be reached if a sufficient force is exerted upon the spring 26 due to the inlet pressure.

Figure 3:
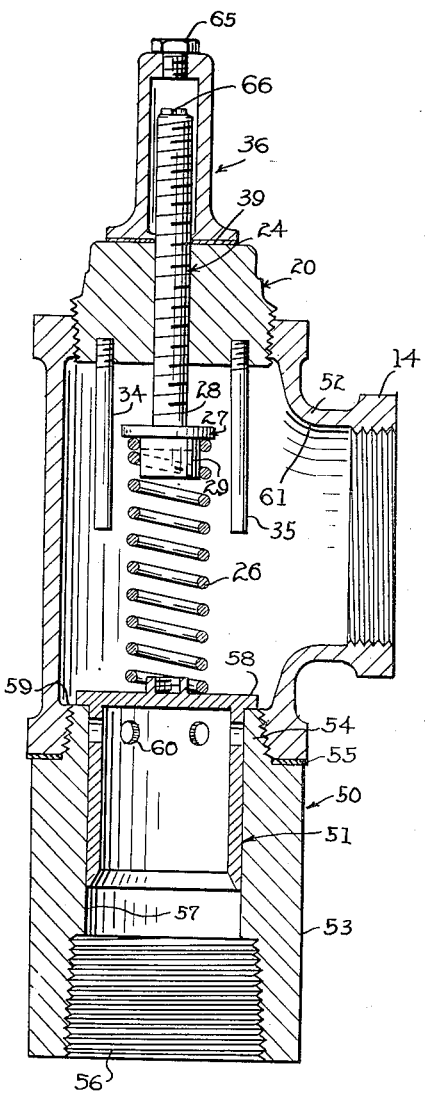
Figure 3 is a longitudinal sectional view of a modified form of the relief valve of the present invention.

In Figure 3 there is shown a modified form of the relief valve of the present invention in which the one-piece valve body 11 is replaced by a two-piece valve body 50, and the valve element 18 is replaced by a modified valve element 51. The modified valve body 50 embodies a first open-ended, T-shaped section 52, and a second open-ended, cylindrical section 53 disposed in end-to-end relation with respect to the section 52 and detachably secured thereto. The securement of the sections 52 and 53 is effected by means of a threaded extension 54 formed on the adjacent end of the section 53, the extension being received within a threaded bore provided in the adjacent end of the section 52. An annealed copper gasket 55 is disposed intermediate the confronting end portions of the sections 52 and 53 to prevent binding between the sections when they are detachably secured together.

The body section 53 is provided with an interiorly threaded portion 56 which extends inwardly from one end thereof and terminates at a point adjacent to and spaced from the other end thereof, the threaded portion 56 particularly adapting the body section 53 for securement to an inlet pipe. The body section 53 is further provided with a longitudinally extending bore 57 which receives the modified valve element 51.

The valve element 51 is in the form of a hollow cylinder having one end closed and provided with an annular flange 58 normally engaged on a seat 59 provided on the adjacent interior bounding portions of the body 50. The periphery of the valve element 51 is provided with a plurality of circumferentially spaced apertures 60 for the discharge therethrough of fluid from the inlet connected end of the section 53 into the interior 61 of the body section 52. It is to be noted that the total area of the apertures 60 is equal to the area of the inlet end of the section 53 to insure a full capacity flow for the relief valve when the valve element 51 is moved into a position wherein the entire area of the apertures 60 is exposed.

In actual use, the tension provided by the spring 26 can be adjusted by selectively varying the position of the adjusting screw 24 with respect to the valve element 51. Since this is the only adjustment necessary, it is apparent that the device can be operated with speed and facility.

Numerous other modifications of the relief valve of the present invention can be made without departing from the spirit of the invention as set forth in the appended claim.

What I claim is:

A fluid pressure regulating valve construction comprising: A hollow valve body both ends of which are formed open, one end providing an inlet and the body having an outlet intermediate its ends, the body having an interiorly disposed valve seat between the inlet and outlet thereof; a valve element slidably mounted within the inlet end of the body and proportioned to engage against said seat when slidably moved in one direction, said element unseating when moved in an opposite direction for passage of fluid between the inlet and outlet; a closure plug detachably mounted upon the other end of the body and having an end-to-end threaded bore; an adjusting element having external threads throughout its length and engaged threadably in the bore, for movement toward and away from the valve element, the adjusting element having its opposite ends respectively projecting interiorly and exteriorly of the valve body beyond the opposite ends of the closure plug; resilient means interposed between the interiorly projecting end of the adjusting element and the valve element and tensioned to normally urge the valve element against said seat, movement of the adjusting element to selected positions longitudinally of the closure plug being effective to vary the tension of the resilient element; a combined cover and lock for the adjusting element formed as a hollow cap proportioned to enclose the exteriorly projecting end of the adjusting element, said cap having a tapped portion at one end loosely engaged with the threads of the adjusting element, said cap being threadable upon the exteriorly projecting end of said adjusting element into engagement with the closure plug and constituting means effective to lock the adjusting element in selected positions to which it is threadably adjusted relative to the closure plug; a sealing gasket engaged between said cap and plug in the locking position of the cap to prevent leakage through the interengaging threads of the adjusting element and plug bore; and means at the other end of the cap providing access to the interior thereof, for effecting said movements of the adjusting element relative to the closure plug in the plug engaging position of the cap.

References Cited in the file of this patent

UNITED STATES PATENTS

| Number | Name | Date |
|---|---|---|
| 446,757 | Kunkle | Feb. 17, 1891 |
| 1,743,350 | Hopkins | Jan. 14, 1930 |
| 2,017,668 | Meagher | Oct. 15, 1935 |
| 2,209,856 | Smith | July 30, 1940 |
| 2,415,258 | Parker et al. | Feb. 4, 1947 |

FOREIGN PATENTS

| Number | Country | Date |
|---|---|---|
| 18,568 | Australia | Mar. 4, 1929 |